Figure 1:
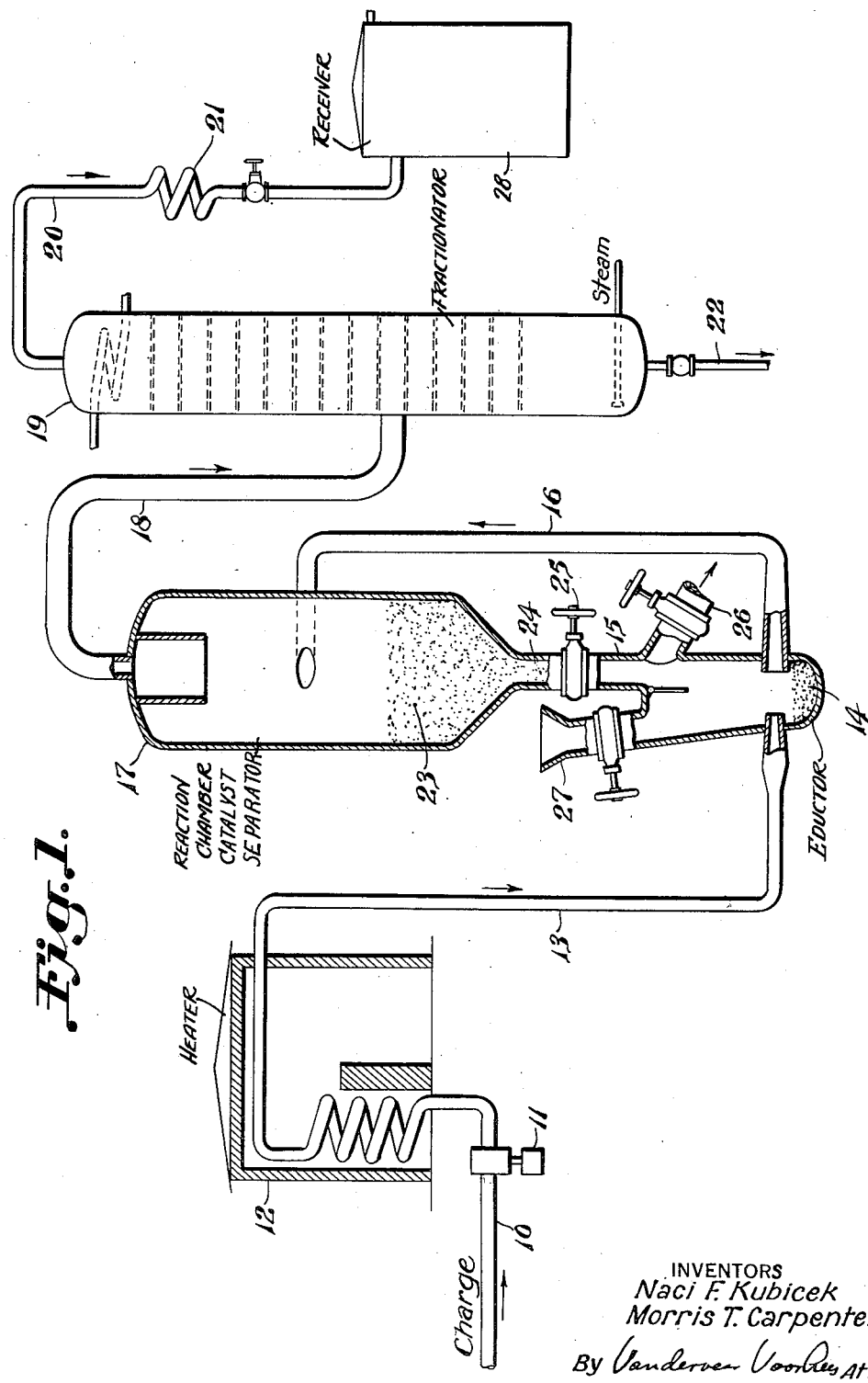

Oct. 30, 1945.  N. F. KUBICEK ET AL  2,387,798
CONTINUOUS CATALYTIC CONVERSION OF HYDROCARBONS
Filed Jan. 27, 1938  2 Sheets-Sheet 1

INVENTORS
Naci F. Kubicek
Morris T. Carpenter
By Vanderver Voorhees Atty.

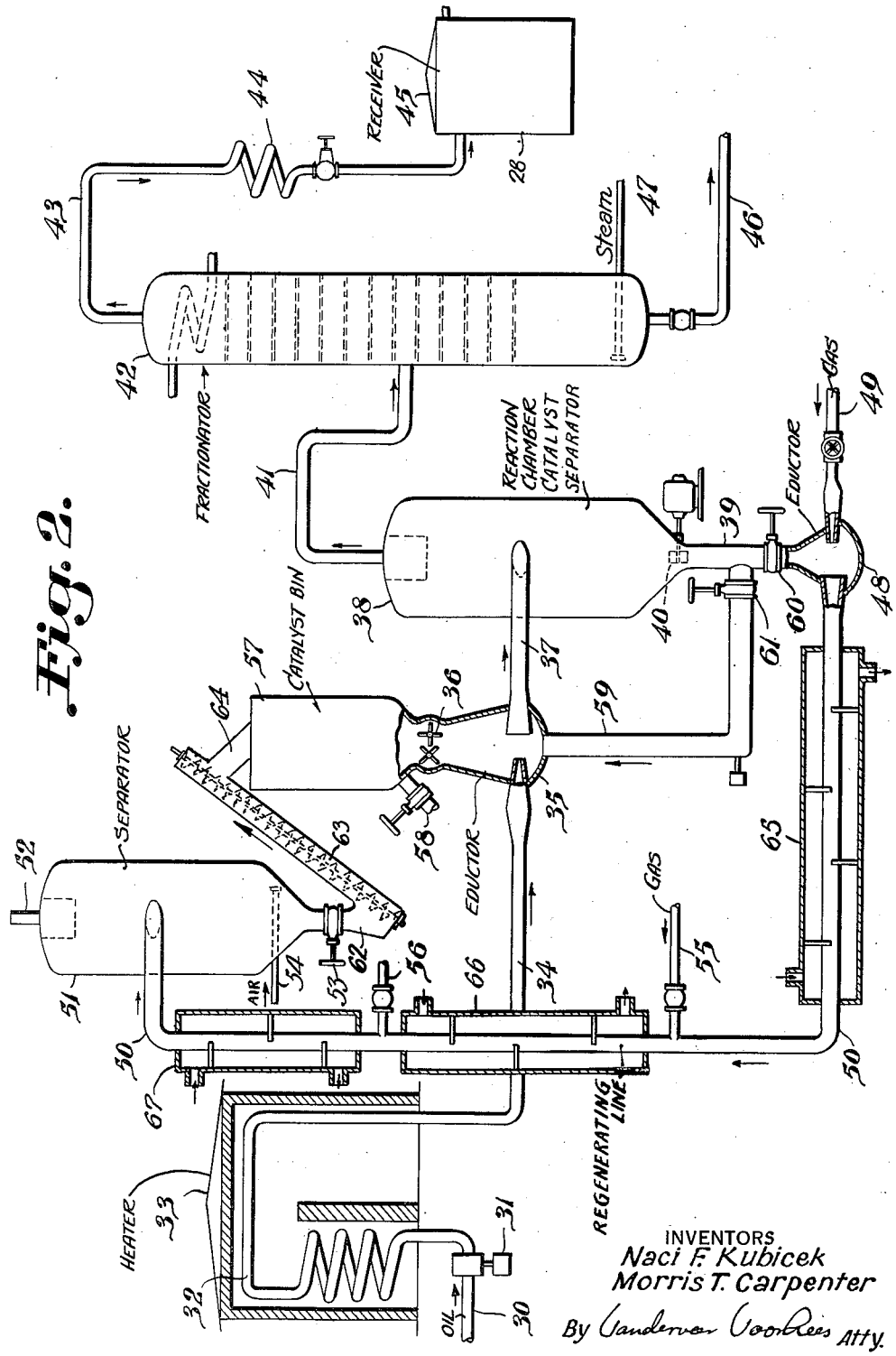

Patented Oct. 30, 1945

2,387,798

UNITED STATES PATENT OFFICE 2,387,798

CONTINUOUS CATALYTIC CONVERSION OF HYDROCARBONS

Naci F. Kubicek, Hammond, Ind., and Morris T. Carpenter, Chicago, Ill., assignors to Standard Oil Company, Chicago, Ill., a corporation of Indiana Application January 27, 1938, Serial No. 187,290

5 Claims. (Cl. 196—52)

This invention relates to the conversion of hydrocarbon oils and particularly to the conversion of distillate oils such as gas oil, kerosene, etc., to gasoline. The invention also relates to the treatment of low knock rating naphthas, straight run heavy naphtha and the like to produce gasoline of high knock rating by the process which may be termed "catalytic reforming." One object of the invention is to effect the conversion of hydrocarbons at elevated temperature in the presence of finely divided catalysts which are difficult to handle in usual catalytic conversion processes. Another object of the invention is to provide a continuous process whereby the catalyst is continually regenerated or replaced without interrupting the conversion process. Still another object of the invention is to provide a method for utilizing low-cost powdered catalysts in place of the more expensive granular or pelleted catalysts and at the same time overcome the difficulty of introducing heat into a system of hydrocarbons and powdered catalysts. Other objects and advantages of the invention will become apparent hereinafter.

The invention is illustrated by drawings which show diagrammatically two modifications thereof. Figure 1 shows the method of contacting the hydrocarbons with the catalyst and recycling the catalyst within the conversion system. Figure 2 describes essentially the same except that means are shown for regenerating the catalyst within the system.

Referring to Figure 1, the charging stock, which may be Mid-Continent gas oil, is introduced by line 10 and pump 11 to heater 12 where the temperature is raised to the desired conversion temperature or preferably somewhat above. For example, if it is desired to conduct the conversion reaction at a temperature of 900° F. the oil may suitably be heated to a temperature of 925–950° F. (in some cases, especially where the charging stock is a light gas oil of about 38–40° A. P. I. gravity or a heavy naphtha, the stock may be heated to 975–1050° F. and the catalytic reaction carried out at 950°–1025° F.).

The hot vapors are conducted by transfer line 13 to eductor 14 where powdered catalyst is introduced by line 15 into the stream of oil vapors passing through the eductor at high velocity. The catalyst is carried along suspended in the oil vapors through line 16 leading to reaction chamber-separator 17 which is designed on the general plan of a cyclone separator. Line 16 is preferably connected to the reactor 17 in such a way that the vapors are introduced tangentially at high velocity, thereby causing them to swirl and assist in separating the powdered catalyst from the vapor which is discharged from the reactor by line 18 leading to fractionator 19 where the vapors are fractionated to recover the gasoline therefrom. Gasoline vapors are withdrawn by line 20 and condensed in condenser 21 leading to receiver 28 while uncracked heavier oils are discharged from the system by line 22.

The pressure employed in the catalyst contacting step of our process is preferably near atmospheric pressure, for example 10–25 pounds per square inch gage. Higher pressures are employed in the transfer line 13 leading to the eductor 14 in order to facilitate the introduction of the catalyst. If desired, however, we may operate the catalytic process at substantially higher pressures, e. g., 50–100 pounds per square inch within the reaction chamber 17. It is essential, however, to avoid the use of pressures which will permit the condensation of liquids within the reaction chamber.

When the catalyst has separated from the oil vapors in chamber 17 it falls to the bottom and collects in a mass as shown at 23. From this mass it is withdrawn through line 24 leading to gate valve 25 which is adjusted to control the recycling of the catalyst. In place of gate valve 25 we may employ a mechanical feeder of any type in order to regulate the recycling of the catalyst more accurately.

After the operation has continued for some time and the catalyst shows a loss of activity, usually due to the deposition of carbonaceous matter thereon, we may discard part of the catalyst from chamber 17 by means of by-pass 26 and the discarded catalyst may be replaced by introducing fresh catalyst through feeder 27. It is important to maintain a closed system for handling the catalyst because of the high temperature which is above the ignition point of the carbonaceous matter accumulating thereon. We may also employ suitable agitators for assisting the flow of the catalyst in chamber 17 and catalyst mass 23.

Referring to the other modification of our process shown in Figure 2, oil may be charged to the system by line 30 and pump 31 which forces the oil stream through pipe coil 32 in heater 33. The hot oil vapors are conducted by transfer line 34 to eductor 35 where catalyst is introduced by feeding mechanism 36. The powdered catalyst is carried by the oil vapors through line 37 into reaction chamber-separator 38, similar in design to chamber 17. The catalyst is caused to separate from the vapors in the chamber 38 and falls to the bottom of the chamber where it is withdrawn continuously by line 39. Agitating device 40 serves to maintain the catalyst in motion and prevent coking or bridging. The vapors separated from catalyst in chamber 38 are conducted by line 41 to fractionator 42 where gasoline is separated by vapor line 43 leading to condenser 44 and gasoline distillate receiver 45. Heavy oils, such as cracked gas oil and so-called cycle stock, are withdrawn from fractionator 42 by line 46. Steam may be admitted to fractionator 42 by line 47 to assist in the separation.

The pressures employed in the apparatus shown in Figure 2 may be the same as those described for use in connection with the apparatus shown in Figure 1.

Spent or partially spent catalyst withdrawn by line 39 is transferred by eductor 48 supplied by a stream of gas injected through valved line 49 and forced through line 50 leading to cyclone separator 51. It is preferred to introduce an oxygen-containing gas in line 49 in order to effect regeneration of the catalyst in line 50, the oxygen combining with the carbonaceous matter with which the catalyst particles are contaminated. The amount of oxygen required for this purpose may be suitably about 0.1 to 10% in the gas introduced by line 49. It is important to control the oxygen concentration to prevent too rapid combustion of the carbonaceous matter on the catalyst in order to avoid overheating the catalyst particles and permanently destroying their catalytic activity. It is preferred to control the oxidation of the catalyst to maintain a temperature between about 900-1000° F. Temperatures appreciably exceeding 1000° F. are undesirable, especially in the case of certain catalysts such as aluminum silicate, fuller's earth, argillaceous earths, etc. Certain other catalysts, such as chromium oxide, may be heated to higher temperatures but in this case also it is important to control the temperature within desired limits.

Temperature control may also be effected to some extent by cooling line 50. This may be accomplished by conducting the catalyst in line 50 through a cooling coil surrounded by a suitable cooling medium flowing through cooling jackets 65, 66 and 67. In general it is desirable to regulate the length and/or volume of line 50 to provide for most of the catalyst regeneration in passing through the line. The regeneration, however, may be completed in separator 51.

Separator 51 is suitably of the cyclone type from which the spent gases are discarded by vent 52 and the catalyst is withdrawn by gate valve 53. Additional oxygen-containing gas, for example air, may be introduced at 54 to insure complete regeneration of the catalyst. If desired additional oxygen-containing gas may also be introduced into line 50 by inlets 55, 56, etc. spaced along the course of the catalyst stream.

Regenerated catalyst from valve 53 is conducted through line 62, conveyor 63 and line 64 into bin 57 whence it is recycled to the conversion system by automatic feeder 36 hereinbefore mentioned. Feeder 36 may be of any suitable type, for example it may be comprised of a hopper and worm, to control the rate of flow of catalyst to eductor 35. New catalyst may be added to the system from time to time by introducing it into bin 57 and spent catalyst may be withdrawn from the system by removing catalyst from bin 57 through discharge 58.

If desired the catalyst may be recycled from line 39 directly to eductor 35 by conveyor 59, gate valves 60 and 61 being adjusted as desired. Instead of a conveyor we may employ another eductor for this purpose, diverting all or part of the vapor stream from 34 therethrough. All or part of the catalyst passing through line 39 may be recycled in this manner and part of the catalyst may be continuously regenerated as shown. If desired, the catalyst may be segregated in batches, recycling all the catalyst from line 39 to eductor 35 until the activity has decreased to a point where the conversion reaction is impaired and thereafter regenerating the catalyst by diverting the stream from line 39 to eductor 48 and regenerating chamber 51.

One of the outstanding advantages of our process lies in the continuous handling of low cost powdered catalyst without difficulties which arise from attempting to heat the catalyst in the oil or vapor stream. In our process we introduce into the oil vapors all the heat necessary for the reaction before introducing the catalyst. Heretofore it has been attempted to heat a stream of oil or oil vapor and catalyst in drums or pipe heaters, but this operation is attended with serious difficulties from the deposition of carbonaceous matter, coke, etc. on the heating surfaces. Heating of the hydrocarbon oils to high temperatures is always fraught with difficulties of this nature and the presence of finely divided inorganic catalyst greatly increases the difficulty due partly to the actual accumulation of the catalyst on the heating surfaces and partly to the effect of the catalyst in accelerating the deposition of the hydrocarbons with formation of heavy products, asphalt-like materials and coke. We have overcome this difficulty by heating the oil vapors to a temperature sufficient to effect the desired reaction and rapidly introducing and dispersing the catalyst before any opportunity is provided for coke formation.

We have also provided in our process a means for obtaining repeated contact of catalyst with hydrocarbons supplied to a conversion zone whereby the catalyst activity may be substantially exhausted before it is regenerated.

Several examples of catalysts have been mentioned hereinbefore. In general we prefer to employ the natural clays, such as fuller's earth fines, bentonite, acid treated bentonite or Death Valley clay, and clays whose catalytic activity has been promoted by the addition of various materials such as a small amount, e. g. 0.1 to 1% of oxides of nickel, chromium, manganese, molybdenum and other metals of the sixth and eighth groups of the periodic system. We may also employ compounds of boron, e. g. boron silicate and aluminum borate, bauxite, silica gel, silica gel promoted with aluminum oxide, etc. In general, we prefer to employ the catalyst in a finely divided form which will substantially all pass through a 100 mesh screen. In general, by our process, we may employ those catalysts of lower activity such as the lower grades of fuller's earth or decolorizing clay, because of the increased efficiency of using the catalyst in powder form. Also, we may employ a higher ratio of catalyst to stock treated without much increase in the cost of the processing, on account of the improved method of handling and regeneration. Thus, where in previous practice from 3 to 10 volumes of oil have been treated by one volume of a specially prepared catalyst, we may use much cheaper catalysts and regenerate after treating only 1 to 5 volumes of oil per volume of catalyst, yet without incurring undue expense in handling the large amount of catalyst.

The temperature of our process may be varied over a considerable range, depending on the stock treated. In general the lighter stocks require a higher temperature to effect the desired conversion. With some stocks temperatures as low as 800° F. may be employed, although in general we prefer to operate at temperatures above 850° F. for example, 850 to 1050° F. and preferably in the range of 875-925° F. We may also recycle the heavier uncracked oils produced in our process or we may operate our process in a series of stages, conducting the uncracked heavy products boiling above the gasoline boiling range through a succession of cracking operations such as described hereinabove.

Although we have described our process in connection with certain specific embodiments thereof, we do not intend to be limited except insofar as set forth in the following claims.

We claim:

1. In the process of cracking heavy hydrocarbon oils into high knock rating gasoline wherein the vapors of the hydrocarbon oil are contacted with a suspended, solid cracking catalyst at a temperature within the cracking range, the improvement comprising completely vaporizing a stream of said hydrocarbon oil and heating the vapors to the desired reaction temperature, dispersing said catalyst directly in said vapors, introducing catalyst and hydrocarbons into an enlarged reaction zone consisting of a single enlarged space and therein effecting the cracking of said hydrocarbons in the absence of a liquid phase, effecting the separation of catalyst from hydrocarbon vapors in said reaction zone, withdrawing converted hydrocarbon vapors from the upper part of said reaction zone above the point of introducing hydrocarbons therein and withdrawing separated catalyst from the lower part of said reaction zone below the point of introducing hydrocarbons therein.

2. In the process of cracking heavy hydrocarbon oil into high knock rating gasoline motor fuel wherein the hydrocarbon oil is vaporized and the vapors are then contacted with a powdered solid hydrocarbon conversion catalyst at a conversion temperature of about 850 to 1025° F. and a pressure between atmospheric and 100 pounds per square inch, the improvement comprising completely vaporizing a stream of said hydrocarbon oil and heating the vapor stream about 50° F. above the desired cracking temperature, continuously introducing a fresh, dry powdered, solid, conversion catalyst directly into the said stream of superheated hydrocarbon vapor, then conducting the hydrocarbon vapor and catalyst dispersed therein to a cracking zone of enlarged cross section wherein the desired conversion is completed by the contained heat of the vapors and catalyst, separating the finely divided catalyst from said converted hydrocarbon vapors at a temperature above the condensation temperature of said vapors and recycling said catalyst back to said heated hydrocarbon vapor stream.

3. In a catalytic hydrocarbon conversion process which comprises contacting hydrocarbon vapors with a mass of moving solid conversion catalyst of small particle size in a contacting zone maintained under conversion conditions whereby catalyst becomes deactivated by the deposition thereon of carbonaceous material and requires regeneration for continued use, continuously introducing catalyst to said zone and continuously withdrawing catalyst from said zone, continuously introducing a hydrocarbon charging stock into said zone and continuously separating hydrocarbon conversion products from catalyst on which carbonaceous material has been deposited, the improved method of operation which comprises suspending at least a major portion of the separated catalyst in a stream of oxygen-containing gas, passing said suspension of catalyst in oxygen-containing gas through a regeneration zone of small cross-sectional area to a zone of large cross-sectional area while simultaneously effecting combustion of a part of the carbonaceous deposits by the oxygen content of said gas, accumulating a mass of catalyst in said zone of large cross-sectional area, introducing additional oxygen-containing gas at a low point in said zone of large cross-sectional area and passing said additional gas upwardly through said accumulated catalyst therein for effecting further combustion of carbonaceous deposits from said catalyst, withdrawing gases from the upper part of said zone of large cross-sectional area and separately withdrawing catalyst downwardly from the zone of large cross-sectional area for further introduction into said contacting zone.

4. In the process of continuously converting hydrocarbons into more valuable products by contacting said hydrocarbons in gaseous form with a solid conversion catalyst in finely divided form at a conversion temperature, the improved method of operation which comprises vaporizing said hydrocarbons, suspending said catalyst in said vaporized hydrocarbons, introducing said suspension into a zone of large cross-sectional area, effecting conversion in said last-named zone whereby the catalyst in said zone becomes deactivated by carbonaceous deposits which accumulate thereon, withdrawing gasiform conversion products from the upper part of said zone of large cross-sectional area, separately withdrawing deactivated catalyst downwardly from said zone of large cross-sectional area, dispersing the downwardly withdrawn deactivated catalyst in a stream of oxygen-containing gas and conducting said catalyst by means of said gas stream through a zone of small cross-sectional area to a second zone of large cross-sectional area while simultaneously effecting combustion of a part of the carbonaceous deposits, accumulating a mass of catalyst in said second zone of large cross-sectional area, passing additional oxygen-containing gas upwardly through said second zone of large cross-sectional area for effecting further combustion of carbonaceous deposits, withdrawing a gasiform stream from the upper part of said second zone of large cross-sectional area, separately withdrawing catalyst downwardly from the second zone of large cross-sectional area and returning said last-named downwardly withdrawn catalyst for further dispersion in hydrocarbon vapors.

5. In the process of continuously converting hydrocarbons into more valuable products wherein the hydrocarbons are contacted with a solid conversion catalyst in finely divided form at a conversion temperature, the improved method of operation which comprises completely vaporizing a confined stream of said hydrocarbons and superheating said stream to a temperature above said conversion temperature, passing said superheated stream at high velocity as a vapor jet directed into a confined zone of increased cross-section, continuously introducing said catalyst into said jet whereby the catalyst is dispersed in said vapor stream, conducting said catalyst by means of said vapor stream to a reaction zone of large cross-sectional area, effecting hydrocarbon conversion in said reaction zone by means of the catalyst suspended in hydrocarbon vapors whereby the catalyst becomes deactivated by deposition of carbonaceous matter thereon, separating catalyst from conversion vapors in said zone of large cross-sectional area and withdrawing conversion vapors from the upper part of said zone, separately withdrawing catalyst from the lower part of said conversion zone, conducting said separated catalyst into a high velocity jet of oxidizing gas whereby the catalyst is dispersed in an oxidizing gas stream, conducting the oxidizing gas stream with suspended catalyst through a restricted zone to a second zone of large cross-sectional area, accumulating catalyst in said second zone of large cross-sectional area, passing additional oxidizing gas upwardly through said accumulated catalyst in said second zone of large cross-sectional area, removing a gasiform stream from the upper part of said second zone of large cross-sectional area and separately removing catalyst downwardly from said second zone of large cross-sectional area and returning the catalyst so withdrawn for suspension in said vapor jet.

NACI F. KUBICEK.
MORRIS T. CARPENTER.